Patented Dec. 8, 1942

2,304,112

UNITED STATES PATENT OFFICE 2,304,112

SENSITIZING DYES CONTAINING THIENYL THIAZOLE RADICALS AND INTERMEDIATES THEREFOR

Edmund B. Middleton, Woodbridge, N. J., assignor, by mesne assignments, to E. I. du Pont de Nemours & Company, Wilmington, Del., a corporation of Delaware No Drawing. Application March 20, 1941, Serial No. 384,412

4 Claims. (Cl. 260—302)

This invention relates to thiazoles which are substituted by heterocyclic sulfur containing radicals and to their preparation. More particularly, it relates to 2-methyl-4-thienyl thiazole and its salts and derivatives thereof and to their preparation. In one of its aspects it relates to thiocarbocyanine dyes containing one or more 2-methyl-4-thienyl thiazole radicals and to their preparation from the aforementioned compounds.

This application is a continuation-in-part of my copending application, Serial No. 250,453, filed January 11, 1939, which is directed to photographic emulsions containing novel dyes obtainable by the processes of this application.

This invention has for an object the preparation of new heterocyclic nitrogen compounds which are useful in the chemical and allied arts and more particularly for preparing dyes having sensitizing properties. A further object is the preparation of cyanine dyes which contain a heterocyclic substituent in a heterocyclic nitrogen nucleus. A still further object is the preparation of such dyes which may be used with photographic silver halide emulsions to extend the spectral sensitivity thereof. A further object is to provide a new use for methyl thienyl ketone. Still other objects will appear hereinafter.

The above and other objects are accomplished by the following invention which involves the preparation of 2-methyl-4-thienyl thiazole and its salts and the preparation of organic derivatives of these intermediates and sensitizing dyes therefrom.

In one embodiment of the invention which is concerned with sensitizing dyes, 2-methyl-4-thienyl thiazole is first reacted with an alkyl salt to form a salt of said thiazole. The salts are further reacted with an ortho-ester of a carboxylic acid. The two reactions may be carried out stepwise or simultaneously.

The ortho esters useful in accordance with the above teachings may be simple or mixed and of aliphatic, cycloaliphatic or aromatic carboxylic acids, including aromatic substituted aliphatic acids and aliphatic substituted aromatic acids. The ortho esters of the carboxylic acids result in carbocyanine dyes which comprise two to three heterocyclic nitrogen nuclei at least one of which is a 2-methyl-4-thienyl thiazole radical bridged by a trimethenyl radical —CH=CH—CH= or by a substituted trimethenyl radical of the formula —CH=C—CH=
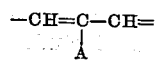

wherein A is a hydrocarbon radical. In the case of the ortho esters of aliphatic carboxylic acids having more than two carbon atoms in the acid molecule, A is an alkyl radical. When an ortho ester of an aromatic carboxylic acid is used, A is an aryl radical. When orthoformic acid esters are used, however, the central hydrogen atom may be replaced by heterocyclic nuclei.

The invention is not limited, however, to the use of a 2-methyl-4-thienyl thiazole compound as a sole reactive heterocyclic nitrogen compound and to the preparation of the symmetrical cyanine dyes, although this represents an important embodiment thereof. Other heterocyclic nitrogen compounds having a reactive group in the alpha or gamma position to a heterocyclic nitrogen atom may be used.

Furthermore, cyanine dyes which are bridged by a mono-methenyl radical (—CH=) may be prepared by another embodiment of the invention by reacting 2-methyl-4-thienyl thiazole with a heterocyclic nitrogen compound of the type used in the preparation of cyanine dyes having a reactive thioether or selenoether group in an alpha or gamma position to a heterocyclic nitrogen atom or a reactive methyl or methylene group in such positions. Such compounds include the quaternary salts of the thioethers and selenoethers of substituted and unsubstituted thiazoles, thiazolines, oxazoles, oxazolines, selenazoles, selenazolines, pyridines, quinolines, indolenines, diazines, e. g. pyrimidines, thiadiazoles, and quinazolines and the corresponding polycyclic compounds, such as benzthiazoles, naphthazole and anthrathiazole.

The invention will be further illustrated but is not intended to be limited by the following examples in which the parts stated are parts by weight.

EXAMPLE I

Preparation of 2-methyl, 4-thienyl thiazole

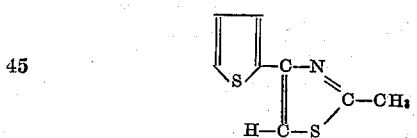

Four and one-half parts of methyl thienyl ketone, prepared according to Organic Synthesis volume 18, page 1, published by John Wiley & Sons, New York city, in carbon bisulphide were treated with 6 parts of bromine dissolved in a small amount of carbon bisulphide. The bromine solution was added drop by drop while a current of $CO_2$ was passed through the solution. This served to stir the solution and to sweep out the HBr formed. The carbon bisulphide was then evaporated and 2.6 parts of thioacetamide dissolved in ethyl alcohol were added. After refluxing this mixture three hours, the alcohol was evaporated, and a little water added. Then dilute sodium hydroxide was added until the solution was quite definitely alkaline and an oil separated. This was extracted with ether, the ether solution dried over potassium carbonate, the ether evaporated and the residue subjected to vacuum distillation. The fraction boiling at 140–150° C. at 15 mm. was collected. It melted at 60–61° C. and was identified as 2-methyl-4-thienyl thiazole.

Various other inert solvents can be used in the bromination step of the above procedure in place of the carbon bisulphide. Suitable other solvents include dioxane, ether, etc. The reaction is preferably carried out below the boiling point of the solvent chosen.

Similarly, various solvents can be used in place of the ethyl alcohol, such as methyl alcohol, ether, dioxane, liquid hydrocarbons, etc. The reaction with thioacetamide is preferably carried out in the cold at the start. Heating to reflux may be resorted to after the reaction starts.

The base 2-methyl-4-thienyl thiazole described in the preceding example may be converted to various cycloammonium salts by treatment with various salt forming reagents such as acids including mineral acids and hydrocarbon substituted mineral acids, e. g. hydrochloric, hydrobromic, hydriodic, sulfuric, phosphoric, etc., organic acids, e. g. acetic, propionic, maleic, fumaric, phthalic, benzoic, etc., and other salt forming compounds, e. g. the aralkyl and alkyl salts, wherein the anions are halide, p-toluenesulfonate, alkylsulfate, sulfate, nitrate, perchlorate, etc. Some of the more insoluble salts can be made from the more soluble salts by a double decomposition reaction, e. g. the ethyl-p-toluene sulfonate can be converted to the bromide by treatment with sodium bromide.

The following examples relate to the preparation of dyes having sensitizing properties from the above-described 2-methyl-4-thienyl thiazole intermediates.

EXAMPLE II

Two parts of 2-methyl-4-thienyl thiazole and one molecular equivalent of ethyl p-toluene sulfonate were heated together in an oil bath at 140° C. for four hours. Dry pyrdine was added and a small amount of ethyl orthoformate. On heating to boiling under a reflux condenser, a bluish color developed. After heating for one hour, a solution of potassium iodide was added. The solution was then allowed to stand in a refrigerator. After several hours, bronze crystals formed. These were filtered off and dissolved in hot alcohol which gave a magenta solution. On cooling, crystals were deposited. They were recrystallized once more from fresh alcohol. The dye formed has the following formula:

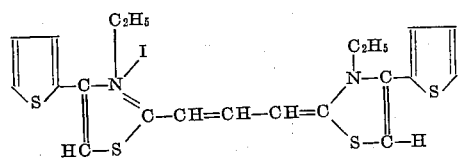

When added to a silver-iodo-bromide emulsion the dye imparts a range of extra sensitivity to 6450 A. with a maximum at about 6200 A. When incorporated in a silver chloride emulsion the dye imparts a range of extra sensitivity to 6800 A with a maximum of 6100 A.

The solution from which the bronze crystals were first deposited was further diluted and a small quantity of blue dye separated. This was recrystallized twice. The dye apparently has the formula:

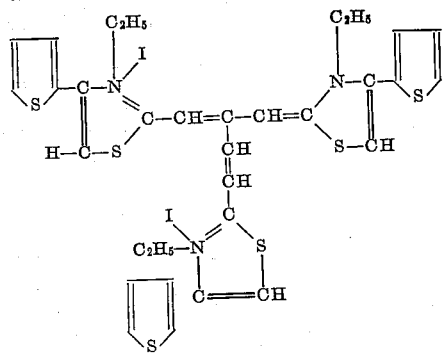

The dye when added to a silver chloride emulsion imparts a range of extra sensitivity to 7200 Å. with a maximum of 6600 Å. Similar results can be obtained by substituting other orthoesters of formic acid, e. g. methyl orthoformate.

EXAMPLE III

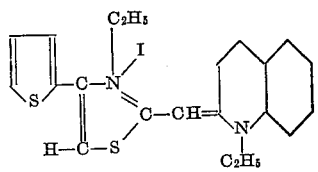

This dye was prepared as follows: Two parts of the ethyl p-toluene sulfonate of 2-methyl-3-thienyl thiazole, prepared as described in Example III, were dissolved in absolute alcohol and then 1.7 parts of 2-methylmercapto quinoline ethiodide were added. After heating to boiling under a reflux condenser, 0.6 part of triethylamine was added. An orange dye formed. It crystallized on cooling and was filtered, washed and recrystallized twice from alcohol. When incorporated in a silver iodo bromide emulsion the dye imparts a range of extra sensitivity to 5700 Å with a maximum of 5550 Å. When incorporated in a silver chloride emulsion it extended its sensitivity to 5800 Å with a maximum at 5380 Å.

In place of the 2-methyl mercapto quinoline may be substituted 2-methyl mercapto benzothiazole, 2-methyl mercapto benzoxazole, 2-methyl mercapto benzselenazole, cycloammonium salts, e. g. ethyl and methyl p-toluene sulfonates, ethyl iodide, etc., whereby similar unsymmetrical salts can be obtained.

Various carbocyanines can be made in a similar manner by first reacting about one mol of a 2-methyl-4-thienyl thiazole salt with one mol of diphenyl formamidine and reacting the resulting compound with a heterocyclic nitrogen containing base containing a reactive methyl group in the presence of acetic anhydride and sodium acetate or a nitrogen base such as pyridine, piperidine, etc. Suitable salts include those mentioned above.

Example IV

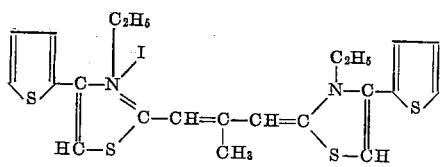

This dye was prepared as follows: One part of 2-methyl-4-thienyl thiazole and 0.8 part of diethyl sulfate were heated for 3 hours at 120–130° C. Then pyridine and .4 part of ethyl orthoacetate were added. On heating to boiling under a reflux condenser, a purplish color formed. After one hour's heating potassium iodide solution was added and the solution allowed to stand in a refrigerator. The precipitate was recrystallized from alcohol, in which it formed a magenta color. When incorporated in a silver chloride emulsion the dye imparts a range of extra sensitivity to 6500 Å. with a maximum of 5820 Å.

Example V

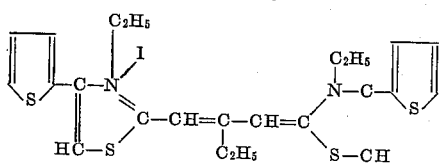

This dye was prepared as follows: One part of 2-methyl, 4-thienyl thiazole and 1 part of freshly redistilled ethyl p-toluene sulfonate were heated for 3 hours at 140° C. Then pyridine and 0.4 part ethyl orthopropionate were added and the solution heated to boiling under a reflux condenser. A purplish color formed. After an hour's heating, potassium iodide solution was added and the solution allowed to cool. The precipitate which formed was recrystallized from alcohol. The alcohol solution was magenta in color. When incorporated in a silver chloride emulsion the dye imparts a range of extra sensitivity to 6400 Å. with a maximum of 3800 Å.

In place of the specific ortho esters of carboxylic acids may be substituted any ester of this type which is capable of reacting with the heterocyclic nitrogen compounds having a reactive methyl or methylene group. Suitable esters include trimethyl ortho-propionate, methyldiethyl n-caproate, methyldiethyl ortho-isocaproate, trimethyl ortho-valerate, trimethyl ortho-formate, trimethyl ortho-benzoate, trimethyl ortho-p-toluate, trimethyl ortho-gamma-phenoxy-butyrate, trimethyl ortho-phenyl-acetate, ethyl orthofuroate, trimethyl ester of cyclohexyl carboxylic acid.

In place of the specific salts of 2-methyl-4-thienyl thiazole set forth in the preceding example, any salt may be prepared by reacting an appropriate acid therewith. Thus, the salts of inorganic acids, e. g. hydrochloric, hydrobromic, hydroiodic, sulfuric, phosphoric, etc., and organic acids, e. g. acetic, propionic, maleic, fumaric, phthalic, benzoic, etc., acids may be prepared.

For photographic uses, however, the arlkyl and alkyl salts are preferred and the anions include halide, p-toluenesulfonate, alkylsulfate, nitrate, perchlorate, or, in fact, any salt forming ion that will not render the dye too sparingly soluble or deleteriously affect the photosensitizing properties of the dye. Methyl and ethyl-p-toluenesulfonates, however, represent the preferred salts for dye condensation reactions.

The condensations are preferably carried out in the presence of an acid binding agent or solvent, e. g. pyridine, piperidine, fused scolium acetate, tri-n-propylamine, and triethanolamine, sodium ethylate, caustic soda, etc. Additional solvents may be used, e. g. acetic anhydride with sodium acetate, alcohol with alkali metal bases, etc.

As stated above, the preparation of unsymmetrical dyes from the novel 2-methyl-4-thienylthiazole compounds also forms an important aspect of the invention. By using a heterocyclic nitrogen compound of the type set forth in the penultimate paragraph preceding the examples or the corresponding alkyl compounds, different from the 2-methyl-4-thienyl thiazoles compounds in the dye condensation reaction, a number of unsymmetrical cyanine and carbocyanine dyes may be prepared.

It will be apparent from the above that the compound 2-methyl-4-thienylthiazole and its cycloammonium salts is of considerable utility in the arts. The compound 2-methyl-4-thienyl-thiazole and the salts herein described are of utility in preparing other dyestuffs. They constitute new dye intermediates which can be used for the preparation of large numbers of chemical compounds, particularly dyes which have sensitizing properties in photographic emulsions containing light or radiation sensitive silver salts. The dyes have a higher overall emulsion speed than ordinary cyanine dyes. In addition, they sensitize into the deep red and approach the infra red. They are particularly useful in emulsions for the photolithographic arts.

As many apparently widely different embodiments of this invention may be made without departing from the spirit and scope thereof, it is to be understood that I do not limit myself to the specific embodiments hereof except as defined by the appended claims.

I claim:

1. The chemical compounds taken from the group consisting of 2-methyl-4-thienylthiazole and its cycloammonium salts.

2. The chemical compound 2-methyl-4-thienyl-thiazole.

3. A 2-methyl-4-thienylthiazole alkyl-p-toluene-sulfonate, wherein the alkyl group contains from 1 to 2 carbon atoms.

4. The process which comprises reacting methyl-thienyl ketone with bromine, reacting the resulting product with thioacetamide and recovering 2-methyl-4-thienylthiazole.

EDMUND B. MIDDLETON.

CERTIFICATE OF CORRECTION.

Patent No. 2,304,112.  December 8, 1942.

EDMUND B. MIDDLETON.

It is hereby certified that error appears in the printed specification of the above numbered patent requiring correction as follows: Page 2, second column, line 2, for "6450 A." read --6450 Å.--; line 5, for "6800 A" read --6800 Å.--; line 61, for "selts" read --salts--; page 3, second column, line 12, for "scolium" read --sodium--; and that the said Letters Patent should be read with this correction therein that the same may conform to the record of the case in the Patent Office.

Signed and sealed this 2nd day of February, A. D. 1943.

(Seal)

Henry Van Arsdale,
Acting Commissioner of Patents.